(12) United States Patent
Philip

(10) Patent No.: US 11,822,916 B2
(45) Date of Patent: Nov. 21, 2023

(54) CORRELATION ENGINE FOR DETECTING SECURITY VULNERABILITIES IN CONTINUOUS INTEGRATION/CONTINUOUS DELIVERY PIPELINES

(71) Applicant: Bank of America Corporation, Charlotte, NC (US)

(72) Inventor: Charles Philip, Mumbia (IN)

(73) Assignee: Bank of America Corporation, Charlotte, NC (US)

( * ) Notice: Subject to any disclaimer, the term of this patent is extended or adjusted under 35 U.S.C. 154(b) by 22 days.

(21) Appl. No.: 17/570,106

(22) Filed: Jan. 6, 2022

(65) Prior Publication Data

US 2023/0214209 A1 Jul. 6, 2023

(51) Int. Cl.
  *G06F 8/65* (2018.01)
  *G06F 8/656* (2018.01)
  *G06F 8/71* (2018.01)

(52) U.S. Cl.
  CPC .............. *G06F 8/656* (2018.02); *G06F 8/71* (2013.01)

(58) Field of Classification Search
  CPC .................................. G06F 8/656; G06F 8/71
  USPC .......................................................... 717/168
  See application file for complete search history.

(56) References Cited

U.S. PATENT DOCUMENTS

| | | | |
|---|---|---|---|
| 10,078,578 B2 | 9/2018 | Adinarayan et al. | |
| 10,324,710 B2 | 6/2019 | Shani et al. | |
| 10,528,332 B2 | 1/2020 | Atkinson et al. | |
| 10,534,701 B1 | 1/2020 | Pande et al. | |
| 10,728,364 B1 | 7/2020 | Licata et al. | |
| 10,754,641 B2 | 8/2020 | Chen et al. | |
| 11,016,738 B2 | 5/2021 | Hoffmann et al. | |
| 2019/0235988 A1 | 8/2019 | Janjua et al. | |
| 2021/0026947 A1* | 1/2021 | Korotaev .............. | G06F 21/577 |

OTHER PUBLICATIONS

"What is CI/CD?", published Jan. 31, 2018, https://www.redhat.com/en/topics/devops/what-is-ci-cd.

* cited by examiner

*Primary Examiner* — John Q Chavis
(74) *Attorney, Agent, or Firm* — Banner & Witcoff, Ltd.

(57) ABSTRACT

Aspects of the disclosure relate to monitoring and detecting security vulnerabilities in software code to be executed in a continuous integration and continuous delivery (CI/CD) environment. A computing platform may receive, via the communication interface, an indication of a user request to deploy a code in a CI/CD environment, in which the user request includes user account information and the code. The computing platform may then analyze the code to identify a presence of one or more potential vulnerabilities in the code, including executing a security process on the code. Based on identifying one or more potential vulnerabilities, the computing platform may thereafter determine an alert action and send, via the communication interface, to the developer computing platform, the alert action.

17 Claims, 10 Drawing Sheets

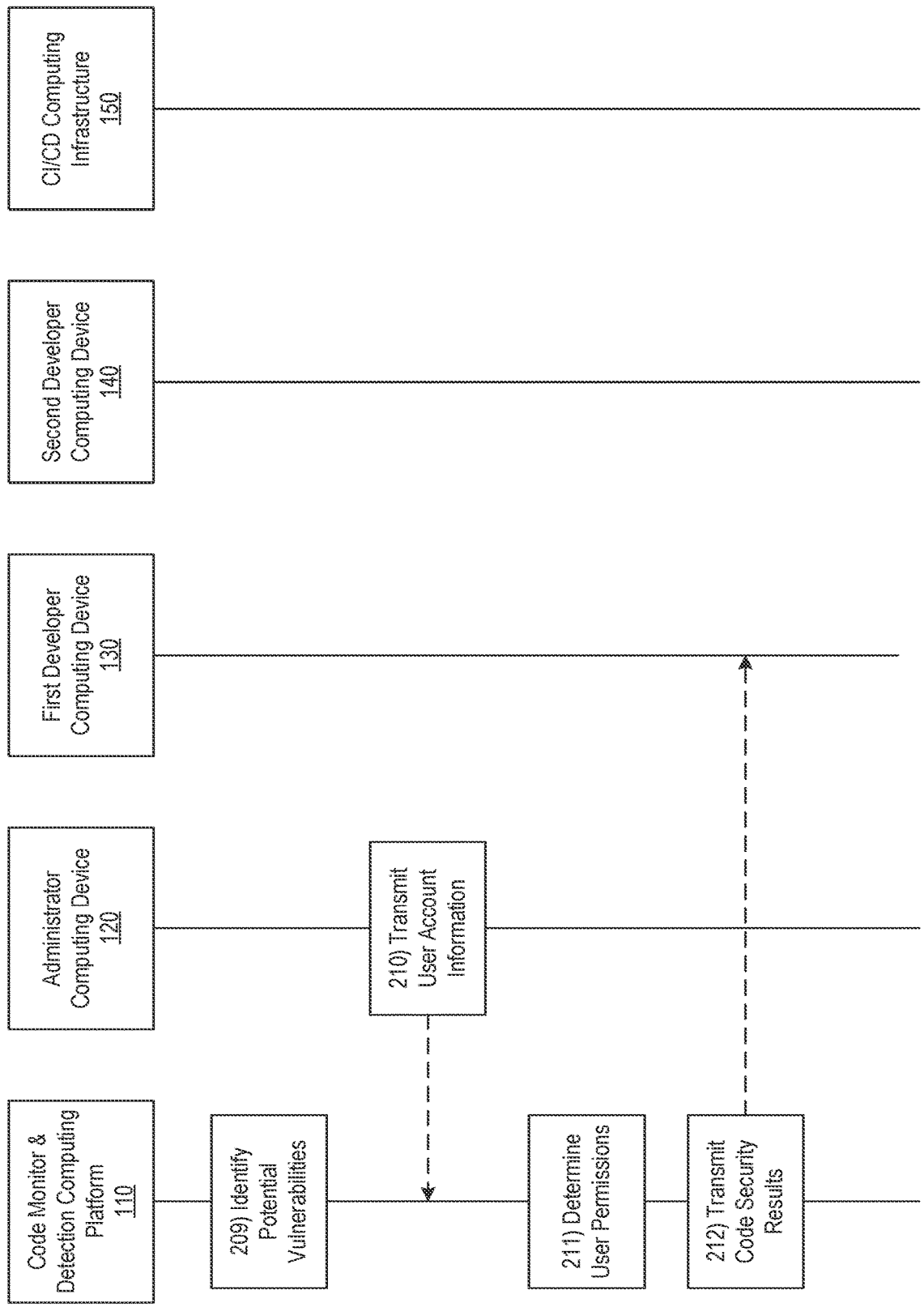

CORRELATION ENGINE FOR DETECTING SECURITY VULNERABILITIES IN CONTINUOUS INTEGRATION/CONTINUOUS DELIVERY PIPELINES

BACKGROUND

Aspects of the disclosure relate to detecting and preventing cybersecurity threats. In particular, one or more aspects of the disclosure relate to computing platforms that monitor and detect security threats and vulnerabilities in software code to be executed in a continuous integration/continuous delivery (CI/CD) environment.

CI/CD environments may be used to verify test codes, including various requirement changes built into test codes. Potential cybersecurity threats exist where remote attackers may attempt to exploit a component in a build environment for a test code that may be directly accessible from outside of the CI/CD environment. In some instances, where developers check in or check out a software code, cybersecurity vulnerabilities may exist based on the CI/CD environment not being completely secure, where developers have access to a production environment for deploying a software code, or where user access setting or privileges are misused. In some instances, an attacker may gain access to sensitive or confidential data. Gaining such privileges, including potentially gaining administrative rights, may potentially compromise any number of processes in an enterprise computing system. Accordingly, enterprise organizations and/or other individuals may experience difficulties trying to monitor and detect potential vulnerabilities in software code to be executed in a CI/CI environment.

SUMMARY

Aspects of the disclosure provide effective, efficient, scalable, and convenient technical solutions that address and overcome the technical problems associated with monitoring and detecting security vulnerabilities in software code to be executed in a CI/CD environment. In accordance with one or more embodiments of the disclosure, a computing platform comprising at least one processor, a communication interface, and memory storing computer-readable instructions may receive, via the communication interface, from a developer computing platform, an indication of a user request to deploy a code in a continuous integration and continuous delivery (CI/CD) environment, wherein the user request includes user account information and the code. The computing platform may analyze the code to identify a presence of one or more potential vulnerabilities in the code. Analyzing the code may include executing a security process on the code. Based on identifying one or more potential vulnerabilities in the code, the computing platform may thereafter determine an alert action. Subsequently, the computing platform may send, to the developer computing platform, the alert action.

In one or more instances, analyzing the code may include assessing a scan history of the code. Assessing the scan history may include comparing the scan history with code scan policies associated with an enterprise organization. In some instances, analyzing the code may include assessing one or more settings based on the user account information. In some instances, analyzing the code may include assessing the code relative to an enterprise security protocol list. In such instances, the enterprise security protocol list may be dynamically updated with a machine learning engine based on vulnerability reports received from at least one user computing device associated with an enterprise organization.

In one or more instances, the computing platform may compile a code result report that includes a summary of the security process executed on the code and the identification of one or more potential vulnerabilities. In some instances, the computing platform may access, from a user account database, user privileges associated with the user account. In such instances, analyzing the code may include analyzing the user privileges. In some instances, determining the alert action may include determining a type of vulnerability of each of the one or more potential vulnerabilities and determining user privileges associated with the user account information.

In one or more instances, analyzing the code may include determining a risk level from a plurality of risk levels for each identified potential vulnerability. In such instances, the alert action may be determined based on the risk level. In some instances, determining the alert action may include identifying an alert action based on an alert action list that includes performing a code scan, compiling a report including identification of one or more flagged portions of the code, modifying one or more portions of the code, transmitting an alert to an administrator computing device associated with an enterprise organization, and transmitting an alert to the developer computing platform. In such instances, sending the alert action may include transmitting a notification to the developer computing device. The notification may include an identification of the one or more potential vulnerabilities associated with the code.

In accordance with one or more embodiments, a method is provided at a computing platform comprising at least one processor, a communication interface, and memory. The method may include receiving, via the communication interface, from a developer computing platform, an indication of a user request, that includes user account information and the code, to deploy a code in a CI/CD environment, analyzing the code and the user account information, and identifying a presence of one or more potential vulnerabilities in the code based on analyzing the code and the user account information. Based on identifying the presence of one or more potential vulnerabilities in the code, an alert action may then be determined from a plurality of alert action. The method may then include sending the alert action, via the communication interface, to the developer computing platform.

In one or more instances, analyzing the code and the user account information may include assessing a scan history of the code and comparing the scan history with code scan policies associated with an enterprise organization. In some instances, the method may include compiling a code result report that includes a summary of analysis of the code and the identification of one or more potential vulnerabilities. In some instances, analyzing the code and the user account information may include assessing the code relative to an enterprise security protocol list that is dynamically updated with a machine learning engine based on vulnerability reports received from at least one user computing device associated with an enterprise organization.

In one or more instances, the method may include accessing, from a user account database, user privileges associated with the user account. In such instances, analyzing the code and the user account information may include analyzing the user privileges. In some instances, determining the alert action may include determining a type of vulnerability of each of the one or more potential vulnerabilities and determining user privileges associated with the user account information.

In one or more instances, analyzing the code and the user account information may include determining a risk level from a plurality of risk levels for each identified potential vulnerability. In such instances, the alert action may be determined based on the risk level. In some instances, determining the alert action may include identifying an alert action based on an alert action list that includes performing a code scan, compiling a report including identification of one or more flagged portions of the code, modifying one or more portions of the code, transmitting an alert to an administrator computing device associated with an enterprise organization, and transmitting an alert to the developer computing platform.

In accordance with one or more embodiments, one or more non-transitory computer-readable media may be provided storing instructions that, when executed by a computing platform comprising at least one processor, a communication interface, and memory cause the computing platform to receive, via the communication interface, from a developer computing platform, an indication of a user request, that includes user account information and the code, to deploy a code in a CI/CD environment, analyze the code to identify a presence of one or more potential vulnerabilities in the code, wherein analyzing the code includes executing a security process on the code, based on identifying the presence of one or more potential vulnerabilities in the code, send, via the communication interface, to the developer computing platform, the alert action, and, based on identifying an absence of potential vulnerabilities in the code, deploy the code to run in the CI/CD environment.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for monitoring and detecting security vulnerabilities in software code to be executed in a CI/CD environment in accordance with one or more example embodiments;

DETAILED DESCRIPTION

Figure 1A:
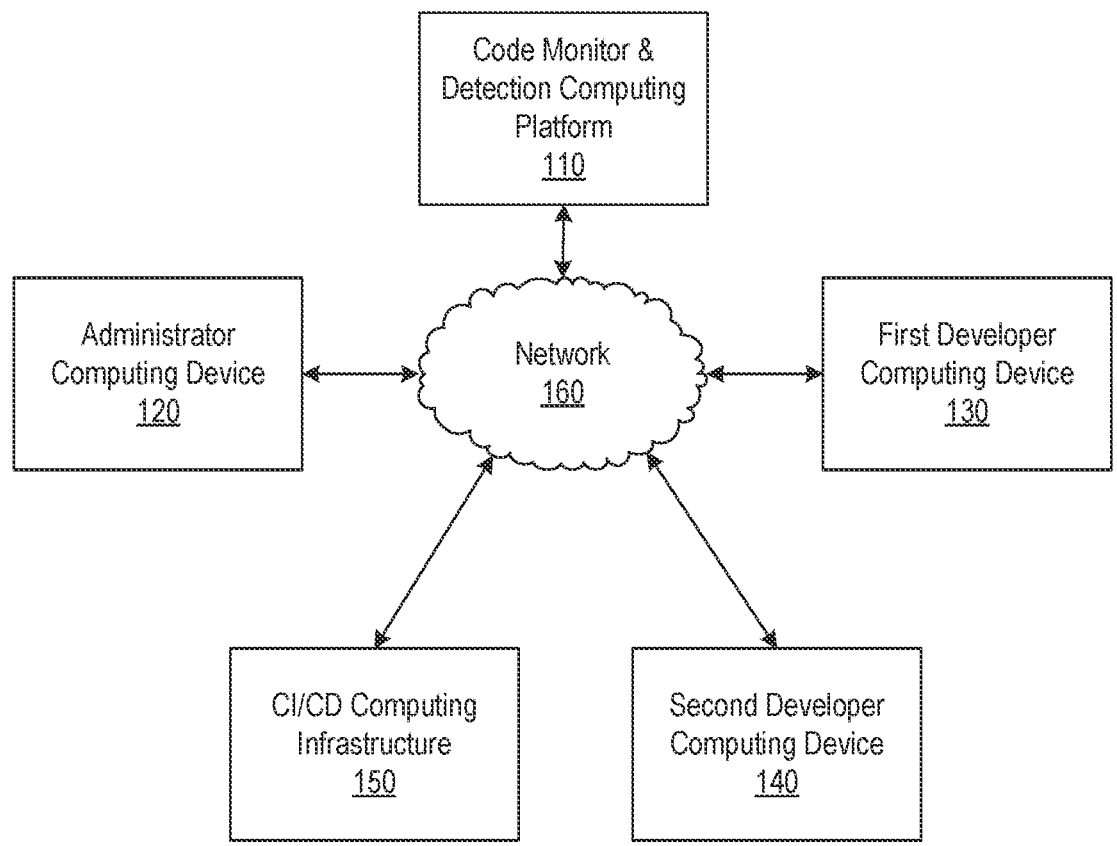
FIGS. 1A-1B depict an illustrative computing environment for monitoring and detecting security vulnerabilities in software code to be executed in a CI/CD environment in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe systems and methods for monitoring and detecting security vulnerabilities in software code to be executed in a CI/CD environment. Continuous integration and continuous delivery (CI/CD) environments are commonly used to verify test codes, including various requirement changes built into test codes. Potential cybersecurity threats may exist where remote attackers attempt to exploit a component in a build environment for a test code that may be directly accessible from outside of the CI/CD environment. In some instances, where developers check in or check out a software code in the CI/CD pipeline, cybersecurity vulnerabilities may exist based on the CI/CD pipeline not being completely secure, where developers have access to a production environment for deploying a software code, or where user access setting or privileges are misused. In some instances, a successful attacker may gain access to sensitive or confidential data, or may gain privileges of an enterprise process. Gaining such privileges, including potentially gaining administrative rights, may potentially compromise a vast number of enterprise processes in the computing system. Some enterprise organizations may employ a framework that aims to prevent and detect such security vulnerabilities in the CI/CD environment. However, such known frameworks often operate inconsistently and fail to address vulnerabilities in the deployment pipeline for software development projects that are made within an organization for external customers and are checked through the CI/CD environment.

In order to solve for the above-noted shortcomings, a computing platform may be configured to accurately detect the presence of improper access control in the CI/CD environment. Anomalies may be detected during a code integration stage on the production environment using a correlated data form code integration tool that incorporates user access control settings. Although enterprise organizations may have policies against such practices, untested and un-scanned code may be attempted to be deployed into a production environment using a bypass switch for scanning in a code integration environment. Apparatuses, systems, and methods described herein may detect such instances. Exposure areas of such untested and un-scanned code may be identified prior to being deployed in the production environment by identifying threats or vulnerabilities already identified in the infrastructure. In some aspects, similar data sets may be correlated (e.g., using machine learning algorithms) for patch testing and deployment in the computing infrastructure and/or various computing devices associated with the infrastructure.

CI/CD environments described herein may be used to verify test codes, e.g., that handle various requirement changes built into the test code. In some aspects, a correlation engine may detect security vulnerabilities in a CI/CD environment, including in managed and unmanaged CI/CD pipelines. Capabilities and accuracy of the correlation engine may be enhanced using keywords and defined rules to identify patterns of potential security violations. The correlation engine may detect a number of various types of anomalies in a test code (e.g., including identification of a scan bypass, abnormal code deletion frequency, and the like). Correlation between vulnerabilities detected on the application infrastructure and security gaps in the application in the CI/CD environment may be employed to more accurately detect potential vulnerabilities. Such configurations may allow for improved security correlation and detection control for identifying threats in a continuous integration and delivery environment, which may in turn protect production environments. Production environments may thus be protected from potential vulnerabilities by using the security correlation and detection control described herein to detect potential threat or vulnerabilities in the continuous integration and delivery environment. In some examples, a graph database may map all the underlying infrastructure associated with application with the enterprise architecture. End-to-end security features and their relationships may thus may assessed for more accurate security vulnerability detection.

An example data flow is now described in which the computing platform may perform data preparation and cataloging using near real time data sources by initially performing data preparation and data cataloging. The near real time data sources may include a content network delivery (CDN) platform, application programming interface (API), security roadmap tools for permission catalog mapping, access control systems, directory access protocol and data systems, search/monitor/analysis data platforms, employee or user account permission data hubs, server patching/vulnerability data server, and the like. In some examples, employee or user account information and setting data (e.g., including employee role and hierarchy data) may be accessed from an enterprise infrastructure. Subsequently, the computing platform may perform data processing and correlation based on the data information received from the data preparation and cataloging step. Next, the computing platform may perform anomaly detection, which may include reassembling data and decoding potential threat patterns. As part of anomaly detection, a correlation algorithm may be employed using various databased information and machine learning techniques to determine potential threats or vulnerabilities based on historical information. Subsequently, the computing platform may employ a model to determine whether a corrective action should be taken, e.g., based on performing a cognitive analysis. The model may include data visualization and/or reporting and insight delivery.

In one example, a developer may check in a code into a code repository, such as a BitBucket code repository, which may in turn, build a trigger code scan (e.g., with Jenkins plugin) to provide a build result. The build result may provide various types of information, including an identity of a user checking in the code, was a code inspection successful, whether a code scan successful, and the like. Subsequently, with information collected may be processed (e.g., with a code inspection or scan API and/or a rule database). Based on this processing, normalization of data and data preparation may be performed to undertake an anomaly detection. Based on the anomaly detection, data may be processed based on a rule engine to make a number of determinations such as if the password is in plain text, if the encryption key is in a code file, if the backdoor script is in the code, and the like. These determinations may result in ultimately determining if the code is malicious or if the code contains potential vulnerabilities. If the code is determined to be malicious or to contain a potential vulnerability, an alert may be generated. Otherwise, the code may be subsequently authorized and validated. Accordingly, security vulnerabilities may be detected and prevented in managed and unmanaged CI/CD environments.

In some aspects, a data correlation program may be used to process unstructured and structured data with user roles and privileges across platforms. Data from the correlation program may then be reassembled with a correlation engine, e.g., using pattern matching, to detect potential vulnerabilities or threats. The anomaly detection engine may identify core threats related to viewing, obtaining, or manipulating software or confidential information. Historical cybersecurity events from a production environment, e.g., from a security information and event management system, may be employed to better understand deviations from expected behavior. A correlation database may store observations from unstructured and structured data in the continuous integration and delivery environment. A graph database may store relationship models of security events identified in the continuous integration and delivery environment.

Aspects discussed herein may provide a number of operational benefits, including the ability to detect a manipulated continuous integration and delivery pipeline configuration, the ability to detect that a code in the repository is untested or has not been scanned, identification of unauthorized access, identification of a deletion of a master branch in the test code, the existence of an unprotected master branch, a determination of too many permissions given to tools interacting with the CI/CD environment, the presence of files containing malicious content being uploaded to the repository, detection of an authorization bypass, identification of code integrated into a production master branch without scanning, detection of malicious code deletion on a production master branch, detection of a software abuse instance (e.g., based on a misuse of user privileges), identification of added projects, removed projects, or modified project settings, identification of an administrative task performed maliciously, and the like.

Systems and methods described herein may be employed to varying degrees. For example, a quick fix for a security patch may include a relatively simple if-then programming script solution based on use of an existing database combined with a validation step. Existing cybersecurity and data engineering systems may be leveraged to integrate data into known security checks. Account owners of identified data points may assist to resolve the issue by determining outliers within a distribution. Server patching may additionally be performed, including a check against a code upload and analysis of change dates and time stamps to insure patching is complete before actual deployment into a production environment.

In another example, a hybrid alert notification system may include a model-based, gradient boosting machine learning algorithm configured to receive manual confirmation or verification. A training dataset may user context and integration data from a historical dataset to improve the correlation algorithm. For example, a current or updated CI/CD database with existing data security features may be included to more accurately identify the presence of potential vulnerabilities in a tested code. The model may be designed to help withstand degradation and to accurately identify the presence of adversarial threats, thereby ensuring enhanced long-term performance with changing input data and user account behavior.

In another example, a full technical remediation system may include a detection engine that uses a multi-layered approach to analyze code data, code variables, and user data. A set of alternative models may be employed that are each configured with a flexible structure. Malicious, suspicious, and/or prohibited high risk behavior may thus be recognized prior to deployment of a code and thus an enterprise computing infrastructure may be safeguarded using pre-deployment scans and an automated security threat removal system. A user account behavior audit system may also help preform periodic audits.

Accordingly, one or more of the systems and methods described herein provide technical solutions to address one or more of these technical deficiencies. To do so, the aspects described herein may employ a correlation engine to track potential cyber security threats, and to take one or more mitigating actions in response to detecting cyber security threats. For example, the correlation engine of the computing platform may analyze line of code to be deployed in a CI/CD. The correlation engine of the computing platform may also examine and track security threats associated with certain lines of code seeking to obtain confidential or proprietary data. By examining lines of code, the correlation engine of the computing platform may mitigate and prevent security threats or attacks. In addition to mitigating security threats or attacks, a security assessment may be provided that relates to the assessed security of a particular code as a potential cyberattack vector. The security assessment may include results and recommendations, e.g., which may be tailored specifically to users, developers, enterprise administrators, browser extensions owners, and the like.

In some examples, a rule engine may be employed to flag certain code or portions of a code that may be subject to potential cyber threats, cyber-attacks, or other potentially malicious activities. In some examples, the rule engine may also store, obtain, or otherwise access user profile data to determine whether a particular user has sufficient user privileges with respect to an identified vulnerability.

Accordingly, various operational benefits are possible, such as detecting vulnerabilities in a code to be deployed in a CI/CD environment, assigning varying risk levels to detected vulnerabilities, identifying authentication risks, identifying suspicious data activities, and the like. Additionally the apparatuses, systems, and method described herein may be easy to integrate, may be scalable, and may be operable independent of specific CI/CD environments.

Figure 1B:
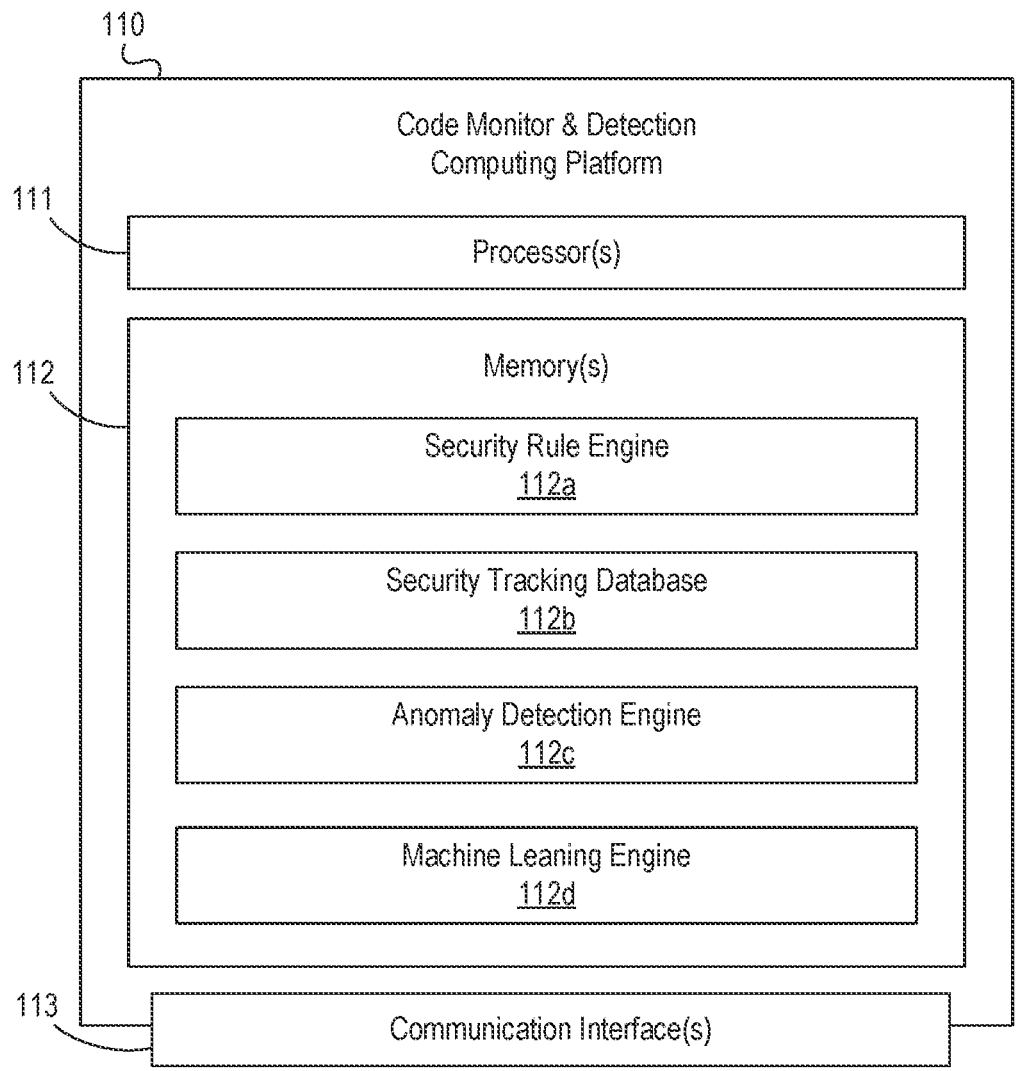

FIGS. 1A-1B depict an illustrative computing environment that tracks and mitigates security threats and vulnerabilities in browser extension engines in accordance with one or more example embodiments. Referring to FIG. 1A, computing environment 100 may include one or more computer systems. For example, computing environment 100 may include a code monitor and detection computing platform 110, an administrator computing device 120, a first developer computing device 130, a second developer computing device 140, and a CI/CD computing infrastructure 150.

As described further below, code monitor and detection computing platform 110 may include a computer system that includes one or more computing devices (e.g., servers, server blades, or the like) and/or other computer components (e.g., processors, memories, communication interfaces) that may be used to monitor and analyze code to be deployed in a CI/CD environment and mitigate security threats and potential vulnerabilities to various systems across an enterprise organization. In some instances, the code monitor and detection computing platform 110 may maintain a database of analyzed codes and related security threats or vulnerabilities associated with those codes, and the code monitor and detection computing platform 110 may use such a database to determine one or more corrective actions responsive to those security threats or vulnerabilities.

Code monitor and detection computing platform 110 may include one or more computing devices configured to perform one or more of the functions described herein. For example, code monitor and detection computing platform 110 may include one or more computers (e.g., laptop computers, desktop computers, servers, server blades, or the like) configured to perform one or more of the functions described herein, as discussed in greater detail below. Code monitor and detection computing platform 110 may be configured to host and/or execute a machine learning engine to provide more efficient code tracking. In some examples, code monitor and detection computing platform 110 may be connected to one or more enterprise computing platforms or devices to receive user account information and/or enterprise security information.

Code monitor and detection computing platform 110 may include distinct and physically separate data centers or other groupings of server computers that are operated by and/or otherwise associated with an organization, such as a financial institution. In addition, code monitor and detection computing platform 110 may house a plurality of server computers and various other computers, network components, and devices. For example, code monitor and detection computing platform 110 may include a plurality of server nodes that are made up of and/or otherwise include one or more servers and/or server blades, which may be monitored and/or controlled by code monitor and detection computing platform 110 and/or one or more other computing devices included in computing environment 100. Each server and/or server blade included in the plurality of server nodes associated with code monitor and detection computing platform 110 may include one or more processors, memories, communication interfaces, storage devices, and/or other components.

Administrator computing device 120 may include one or more computing devices and/or other computer components (e.g., processors, memories, communication interfaces). In addition, and as illustrated in greater detail below, administrator computing device 120 may be configured to receive information from, send information to, and/or otherwise exchange information with one or more devices that are physically present at and/or within a certain range of the enterprise location at which CI/CD computing infrastructure 150 may be deployed. In some examples, however, the administrator computing device 120 may be remote from and/or different from the enterprise location (e.g., where CI/CD computing infrastructure 150 is deployed).

Administrator computing device 120 may be a desktop computing device (e.g., desktop computer, terminal), or the like or a mobile computing device (e.g., smartphone, tablet, smart watch, laptop computer, or the like). In addition, the administrator computing device 120 may be linked to and/or used by one or more enterprise users (who may, e.g., be employees of an enterprise organization operating the enterprise center where administrator computing device 120 is deployed and/or used). For instance, the administrator computing device 120 may be deployed at an enterprise center, such as the enterprise center where CI/CD computing infrastructure 150 is deployed, so that administrator computing device 120 may be used by one or more employees of an enterprise organization operating the enterprise center when such employees are facilitating enterprise software development efforts. For example, the administrator computing device 120 may store and/or execute one or more enterprise applications, such as user account management applications, user history applications, account security applications, and/or other software applications, which may be used by the one or more enterprise users of the administrator computing device 120.

In one or more arrangements, the administrator computing device 120, and other computing devices included in computing environment 100 may be any type of computing device capable of receiving a user interface, receiving input via the user interface, and communicating the received input to one or more other computing devices. For example, the administrator computing device 120 may, in some instances, be and/or include server computers, desktop computers, laptop computers, tablet computers, smart phones, or the like and may include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions. Code monitor and detection computing platform 110 and/or administrator computing device 120 may be configured to provide one or more interfaces that allow for configuration and management of one or more other computing devices and/or computer systems included in computing environment 100, such as one or more interfaces that allow for management of programs accessed by a user computing device, such as the first developer computing device 130 or the second developer computing device 140.

First developer computing device 130 may include a laptop computer, desktop computer, mobile device, tablet, smartphone, or the like that may be used by an individual such as a developer of an enterprise organization (e.g., a financial institution, or the like) and/or a regulatory agency. For example, the first developer computing device 130 may be used by one or more individuals to request, access, or otherwise use various software programs. In some instances, first developer computing device 130 may be configured to display one or more user interfaces (e.g., providing notification of a determined security threat or vulnerability in a particular code, notification that access is blocked to a particular user, and/or other interfaces).

Second developer computing device 140 may include a laptop computer, desktop computer, mobile device, tablet, smartphone, or the like that may be used by an individual such as a developer of an enterprise organization (e.g., a financial institution, or the like) and/or a regulatory agency. For example, the second developer computing device 140 may be used by one or more individuals to request, access, or otherwise use various software programs. In some instances, second developer computing device 140 may be configured to display one or more user interfaces (e.g., providing notification of a determined security threat or vulnerability in a particular code, notification that access is blocked to a particular user, and/or other interfaces).

CI/CD computing infrastructure 150 may include one or more computing devices and/or other computer components (e.g., processors, memories, communication interfaces). In addition, CI/CD computing infrastructure 150 may be configured to host, execute, and/or otherwise provide one or more enterprise applications. For example, CI/CD computing infrastructure 150 may be configured to host, execute, and/or otherwise provide an enterprise applications for user devices, and/or other programs associated with an enterprise server. In some instances, CI/CD computing infrastructure 150 may be configured to provide various enterprise and/or back-office computing functions for an enterprise organization, such as a financial institution. For example, CI/CD computing infrastructure 150 may include various servers and/or databases that store and/or otherwise maintain account information, such as financial account information including account balances, transaction history, account owner information, and/or other information. In addition, CI/CD computing infrastructure 150 may process and/or otherwise execute tasks on specific accounts based on commands and/or other information received from other computer systems included in computing environment 100. Additionally, or alternatively, CI/CD computing infrastructure 150 may receive instructions from the code monitor and detection computing platform 110 and execute the instructions in a timely manner, e.g., for the tracking of potential cybersecurity threats or vulnerabilities.

CI/CD computing infrastructure 150 may include one or more computing devices and/or other computer components (e.g., processors, memories, communication interfaces), and may be configured to perform one or more functions related to event processing (e.g., processing of a trade, or other events). For example, the CI/CD computing infrastructure 150 may include an order management system, an execution system, an allocation system, a usage system, a clearing system, a confirmation system, a payment system, a request for quote system, a settlement system, a position keeping system, and/or other systems involved in event processing.

CI/CD computing infrastructure 150 may include multiple server computers that are owned, operated, maintained, and/or otherwise used by an organization, such as an enterprise organization associated with the code monitor and detection computing platform 110. For example, CI/CD computing infrastructure 150 may include one or more server computers that store and/or otherwise maintain enterprise applications (which may, e.g., be executed by and/or provided to one or more computing devices associated with enterprise users) and/or enterprise information (which may, e.g., be accessed and/or used by the enterprise applications and/or by the one or more computing devices associated the with enterprise users).

For example, CI/CD computing infrastructure 150 may include one or more computer systems that are configured to provide one or more portal interfaces to one or more client devices and/or configured to authenticate one or more client devices and/or users of such devices to such portal interfaces. For example, CI/CD computing infrastructure 150 may include a computer system configured to provide a customer portal, such as an online banking portal, to one or more customers of an organization, such as a financial institution, who may use one or more computing devices to access the portal and/or who may be authenticated to one or more portal user accounts by the computer system using various authentication techniques. In some instances, in addition to being configured to provide an online banking portal associated with a financial institution to one or more customers of the financial institution and/or their associated computing devices, the computer system (which may, e.g., be included in CI/CD computing infrastructure 150) also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Additionally or alternatively, CI/CD computing infrastructure 150 may include one or more client account servers, which may be configured to store and/or maintain information associated with one or more client accounts. For example, the client account server(s) may be configured to store and/or maintain information associated with one or more financial accounts associated with one or more customers of a financial institution, such as account balance information, transaction history information, and/or the like. Additionally or alternatively, the client account server(s) may include and/or integrate with one or more client support servers and/or devices, such as one or more customer service representative devices used by one or more customer service representatives of an organization (which may, e.g., be a financial institution operating one or more computer systems in computing environment 100), to connect one or more customers of the organization with one or more customer service representatives of the organization via one or more telephone support sessions, chat support sessions, and/or other client support sessions.

Computing environment 100 also may include one or more networks, which may interconnect code monitor and detection computing platform 110, administrator computing device 120, first developer computing device 130, second developer computing device 140, and/or CI/CD computing infrastructure 150. For example, computing environment 100 may include a network 160 (which may interconnect, e.g., code monitor and detection computing platform 110, administrator computing device 120, first developer computing device 130, second developer computing device 140, and/or CI/CD computing infrastructure 150).

In one or more arrangements, code monitor and detection computing platform 110, administrator computing device 120, first developer computing device 130, second developer computing device 140, and/or CI/CD computing infrastructure 150 may include any type of computing device capable of sending and/or receiving requests and processing the requests accordingly. For example, code monitor and detection computing platform 110, administrator computing device 120, first developer computing device 130, second developer computing device 140, CI/CD computing infrastructure 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of code monitor and detection computing platform 110, administrator computing device 120, first developer computing device 130, second developer computing device 140, and/or CI/CD computing infrastructure 150, may, in some instances, include special-purpose computing devices configured to perform specific functions.

In some arrangements, code monitor and detection computing platform 110, administrator computing device 120, first developer computing device 130, second developer computing device 140, and/or CI/CD computing infrastructure 150 may be owned and/or operated by an enterprise organization, and/or deployed by enterprise centers that are owned and/or operated by the enterprise organization. As illustrated in greater detail below, some aspects of the disclosure may provide technical benefits that are not found in conventional systems, because code monitor and detection computing platform 110 is able to track various codes, e.g., for the purpose of mitigating security threats and vulnerabilities to data and computing systems. Machine learning (e.g., by code monitor and detection computing platform 110) may be used to efficiently monitor codes and mitigate instances where potential security threats or vulnerabilities have been identified.

Network 160 may include one or more sub-networks (e.g., Local Area Networks (LANs), Wide Area Networks (WANs), or the like). In some examples, network 160 may be associated with a particular organization (e.g., a corporation, financial institution, educational institution, governmental institution, or the like) and may interconnect one or more computing devices associated with the organization. For example, code monitor and detection computing platform 110, administrator computing device 120, first developer computing device 130, second developer computing device 140, and/or CI/CD computing infrastructure 150, may be associated with an organization (e.g., a financial institution), and network 160 may be associated with and/or operated by the organization, and may include one or more networks (e.g., LANs, WANs, virtual private networks (VPNs), or the like) that interconnect extension analysis code monitor and detection computing platform 110, administrator computing device 120, first developer computing device 130, second developer computing device 140, and/or CI/CD computing infrastructure 150, and one or more other computing devices and/or computer systems that are used by, operated by, and/or otherwise associated with the organization.

Referring to FIG. 1B, code monitor and detection computing platform 110 may include one or more processors 111, memory 112, and communication interface 113. A data bus may interconnect processor 111, memory 112, and communication interface 113. Communication interface 113 may be a network interface configured to support communication between code monitor and detection computing platform 110 and one or more networks (e.g., network 160, or the like). Memory 112 may include one or more program modules having instructions that when executed by processor 111 cause code monitor and detection computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of code monitor and detection computing platform 110 and/or by different computing devices that may form and/or otherwise make up code monitor and detection computing platform 110. For example, memory 112 may have, host, store, and/or include a security rule engine 112a, a security tracking database 112b, an anomaly detection engine 112c, and a machine learning engine 112d.

Security rule engine 112a may have instructions that direct and/or cause code monitor and detection computing platform 110 to, for instance, provide rules or similar policy information from a repository to carry out code analysis and/or instructions that direct code monitor and detection computing platform 110 to perform other functions to detect or identify potential security threats or vulnerabilities in a code, as discussed in greater detail below. Security rule engine 112a may have instructions that direct and/or cause code monitor and detection computing platform 110 to execute advanced techniques to provide one or more tracking functions, such as tracking type of commands used or data requested for use by users in an enterprise organization, analyzing those commands, identifying security threats or vulnerabilities in those codes, and determining corrective actions to address identified threats or vulnerabilities.

The security rule engine 112a may also obtain information from a security data correlation engine, which in turn gathers data from various tools available for assessing or analyzing software code, such as virus tools, threat intelligence, proxy exceptions, and the like. The security rule engine 112a may also obtain information from administrator computing device 120, e.g., to update or more security rules, protocols, lists of potential threat indicators, and the like. The security rule engine 112a may also obtain information from the security tracking database 112b, e.g., relating to result of key threats associated with one or more types of commands in a software code.

Security tracking database 112b may store information used by security rule engine 112a and/or code monitor and detection computing platform 110 in application of advanced techniques to track and mitigate security threats or vulnerabilities in various codes and related corrective action activities, and/or in performing other functions. Security tracking database 112b may store information received from administrator computing device 120 (e.g., relating to enterprise-specific cybersecurity settings or preferences) and information from previous analysis of codes, as discussed in greater detail below.

Anomaly detection engine 112c may have instructions that direct and/or cause the code monitor and detection computing platform 110 to process identified security threats or vulnerabilities (e.g., as determined by security rule engine 112a) and to determine a risk associated with such security threats or vulnerabilities, e.g., for the purposes of identifying one or more corrective actions associated with a particular web browser extension. Based on analyzing the various received information, the anomaly detection engine 112c may identify and transmit indications of key threats to other computing devices, such as the administrator computing device 120, the first developer computing device 130, and/or the second developer computing device 140. Based on identification of key threats, the anomaly detection engine 112c may compile and provide one or more reports, such as a result report, a threat report, and the like. In some examples, the anomaly detection engine 112c may also receive analysis and tracking information from the security tracking database 112b.

Machine learning engine 112d may have instructions that direct and/or cause the code monitor and detection computing platform 110 to set, define, and/or iteratively refine optimization rules and/or other parameters used by the code monitor and detection computing platform 110 and/or other systems in computing environment 100.

Figure 2A:
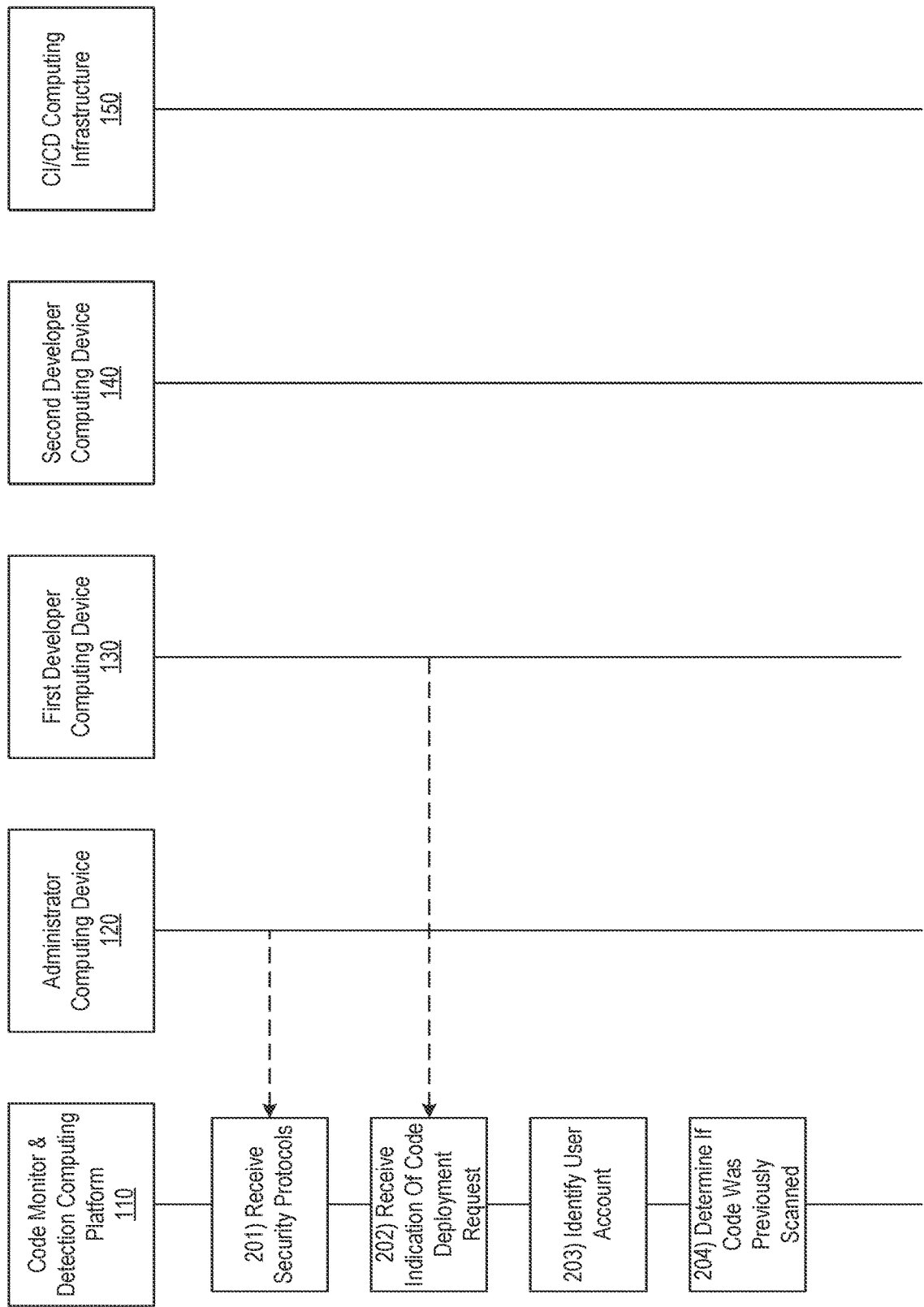

FIGS. 2A-2G depict an illustrative event sequence for monitoring and detecting security vulnerabilities in software code to be executed in a CI/CD environment in accordance with one or more example embodiments. Aspects of the illustrative event sequence described herein provide effective, efficient, scalable, and convenient technical solutions that address and overcome the technical problems associated with tracking and mitigating security threats and vulnerabilities in web browser extensions. Referring to FIG. 2A, at step 201, the code monitor and detection computing platform 110 may receive security protocols from the administrator computing device 120. The code monitor and detection computing platform 110 may receive such security protocol as an initial step in monitoring and detecting security vulnerabilities in software code to be executed in a CI/CD environment, and may continue to receive updated security protocols throughout operations. The security protocols received at step 201 may be specific to security preferences or protocols for a particular enterprise organization and may function to adjust corrective action procedures and/or security alerts initiated by the code monitor and detection computing platform 110. In some instances, the security protocols received at step 201 may be specific to certain developer computing devices across an enterprise organization, specific to certain user accounts across an enterprise organization, based on rules or other settings set by an enterprise organization (e.g., received from the administrator computing device 120), and the like.

At step 202, the code monitor and detection computing platform 110 may receive an indication from a user computing device (e.g., the first developer computing device 130) to request deployment of a code. For example, the indication may be received as part of a developer's code deployment activities. In that regard, the indication may be automatically received at step 202, based a user deployment code in the CI/CD environment, and without user input to the code monitor and detection computing platform 110. In some instances, the code monitor and detection computing platform 110 may receive the indication during the course of monitoring activity at developer computing device, such as the first developer computing device 130 and/or the second developer computing device 140. In some instances, the indication received at step 202 may be responsive to a user request to analyze the code, e.g., if a user is notified of potential vulnerabilities and selects for the code to be analyzed, as will be discussed in more detail below. In some instances, the indication received at step 202 may include a user request to deploy the code in a continuous integration and continuous delivery (CI/CD) environment, and the user request may include user account information and the code.

At step 203, the code monitor and detection computing platform 110 may identify the user account based on the indication. In some instances, the indication may include sufficient information to describe the user account. For example, the indication may include a user name or other identifier of the user associated with the request. In some examples, the code monitor and detection computing platform 110 may store information relating to various users, such as user names, user privileges, user activity histories, and/or other descriptors, in order to identify the user account based on the information in the received indication. In some examples, the code monitor and detection computing platform 110 may be configured to request user account information from the administrator computing device 120, as described in more detail below (e.g., with respect to step 210).

At step 204, the code monitor and detection computing platform 110 may determine if the code was previously scanned, e.g., via a platform configured to analyze the code and detect bugs and security vulnerabilities. The code monitor and detection computing platform 110 may review records, enterprise scan policies, and/or other information stored in the security tracking database 112b as part of determining if the first browser extension was previously scanned. In some examples, the code monitor and detection computing platform 110 may access and review records stored in the security tracking database 112b. The records stored in the security tracking database 112b may include one or more additional identifiers, descriptors, and/or other information related to analysis of the code, such as a filename of the code, the specific environment in which the code is to be deployed, a version of the code, user account information relating to the user(s) deploying the code, identified security threats or vulnerabilities, corrective actions determined in response to identified security threats or vulnerabilities, a timestamp of the analysis, and the like.

Figure 2B:
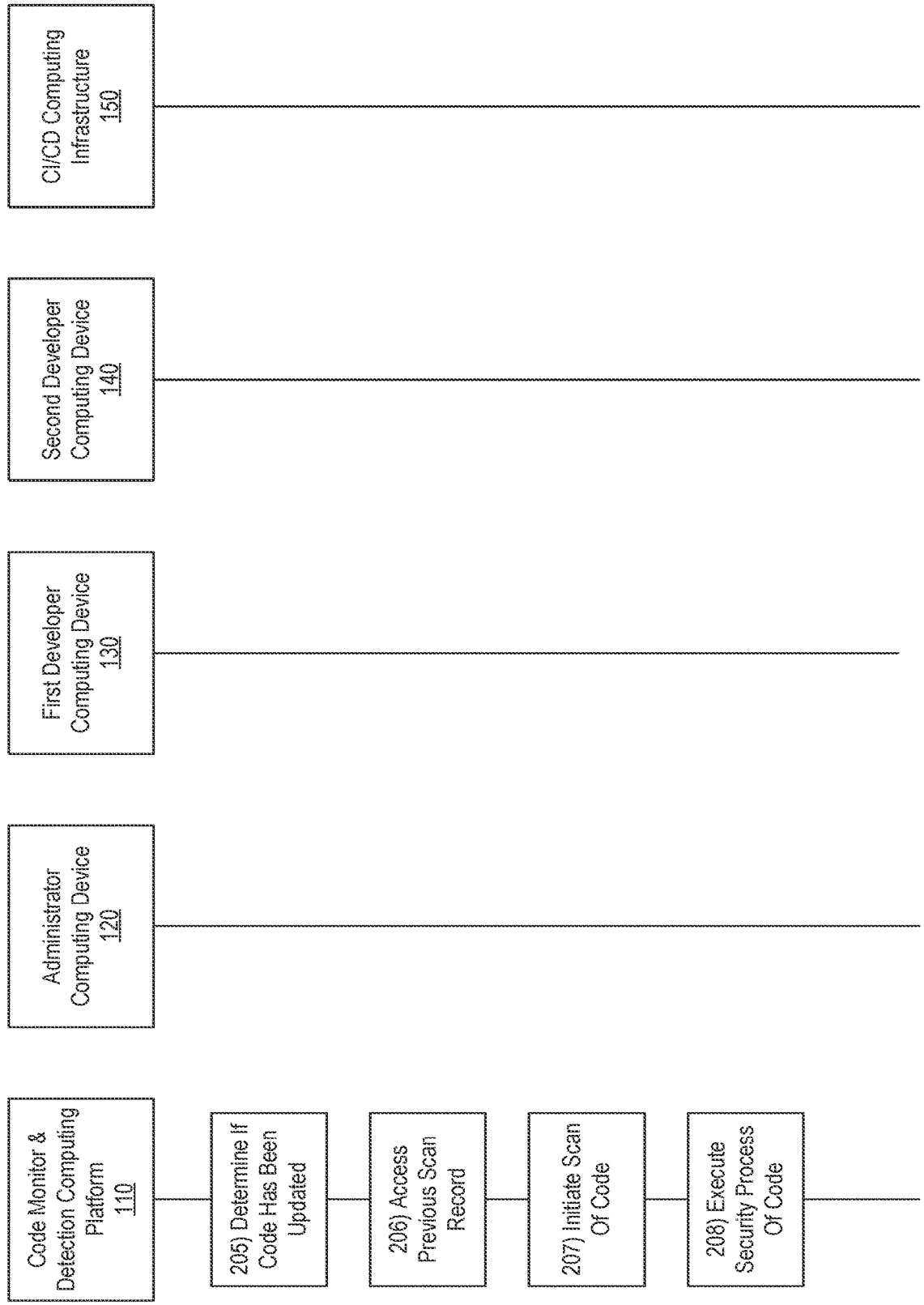

Now referring to FIG. 2B, at step 205, if the scanned has previously been analyzed, the code monitor and detection computing platform 110 may determine if the code has been updated or modified since the previous scan. For example, the code monitor and detection computing platform 110 may access the code version related to the previous scan of the code from the records stored in the security tracking database 112b, and compare that version to the version associated with the indication received at step 202. In some instances, the code monitor and detection computing platform 110 may review the code if any updates or modifications have been made, e.g., by identifying a date of the last version update and comparing that date to the date of last version update of the previous scan or the date of the previous scan.

At step 206, if the code has not been updated or modified since the last scan, the code monitor and detection computing platform 110 may access the full record of the previous scan from the security tracking database 112b. The full record of the previous scan may include one or more identifiers, descriptors, and/or other information related to a security analysis of the code, such as a filename of the code, the specific environment in which the code is to be deployed, a version of the code, user account information relating to the user(s) deploying the code, identified security threats or vulnerabilities, corrective actions determined in response to identified security threats or vulnerabilities, a timestamp of the scan, and the like In some examples, the code monitor and detection computing platform 110 may proceed to access the full record of the previous scan at step 206 if the code has been updated but the code monitor and detection computing platform 110 has determined that the associated updates do not relate to any change in potential security threats or vulnerabilities. Upon accessing the record at step 206, the code monitor and detection computing platform 110 may move on to step 208 (bypassing step 207), as described in more detail below. In some instances, accessing the scan record at step 206 may include comparing the scan history of the code with code scan policies associated with an enterprise organization.

The code monitor and detection computing platform 110 may proceed to step 207 if the code was not previous scanned, or if the code was previously scanned but has been updated since the last scan (e.g., and the code monitor and detection computing platform 110 has determined that the associated updates potentially relate to changes in security threats or vulnerabilities). At step 207, the code monitor and detection computing platform 110 may initiate a scan of the code. Step 207 may include one or more actions suitable for setting up analysis of the code. The scan initiated at step 207 may result in identification of one or more potential vulnerabilities in the code.

At step 208, the code monitor and detection computing platform 110 may execute security process on the code. The security process may include examining and/or analyzing a portion or the entirety of the code. For example, the security process may include reviewing the code for commands that match a predefined list of commands associated with potential vulnerabilities. The predefined list of commands associated with potential vulnerabilities may be dynamically updated with the machine learning engine 112d of the code monitor and detection computing platform 110 based on vulnerability reports received from one or more developer computing devices and/or administrator computing devices associated with an enterprise organization. In some examples, the predefined list of commands may be set by an administrator of an enterprise organization, such as a user associated with the administrator computing device 120. In such examples, the administrator computing device 120 may periodically provide updates to the predefined list of commands, e.g., based on various updates to cybersecurity practices, based on new learning of potential vulnerabilities, and the like. In some instances, executing the security process on the code at step 208 may include assessing the code relative to an enterprise security protocol list. The enterprise security protocol list may be dynamically updated with the machine learning engine 112d based on vulnerability reports received from at least one user computing device associated with an enterprise organization.

Referring to FIG. 2C, at step 209, the code monitor and detection computing platform 110 may identify one or more potential vulnerabilities in the code based on execution of the security process at step 208. For example, identifying one or more potential vulnerabilities may include determining a risk level from a plurality of risk levels for each identified potential vulnerability. In some instances, one or more potential vulnerabilities may be identified based on types of potential vulnerabilities specified by an enterprise organization. For example, an enterprise organization may specify that "read/write" commands create potential vulnerabilities. In such examples, the code monitor and detection computing platform 110 may identify a potential vulnerability wherever a "read/write" command exists in the code. In some instances, the identified potential vulnerability may include a risk level selected from a plurality of risk levels.

Upon identifying at least one potential vulnerability, the code monitor and detection computing platform 110 may seek information related to user permissions associated with the user account identified at step 203. At step 210, the administrator computing device 120 may transmit user account information to the code monitor and detection computing platform 110, e.g., in response to a request from the code monitor and detection computing platform 110 that includes the identification of the user account. In some examples, the user account identified at step 203 may simply include a user name and/or other user identifier, and the user account information received at step 210 may include additional information related to the user account, such as the user name, user title, user privileges, user security classification, and the like. In some examples, the code monitor and detection computing platform 110 may automatically request user information based on the user identifier from the administrator computing device 120 upon detecting at least one potential vulnerability at step 209. In some examples, code monitor and detection computing platform 110 may store certain user information in the security tracking database 112b, and may access user information from the security tracking database 112b as part of step 210.

At step 211, the code monitor and detection computing platform 110 may determine user permissions and/or user privileges based on the user account information received at step 210. In some examples, user permissions may be determined specific to each identified potential vulnerability or simply to the code as a whole. In some instances, a particular user may have permission to override one or more types or categories of identified potential vulnerabilities. In some instances, a particular user may have an exception for certain types of potential vulnerabilities but not for other types of vulnerabilities. In some instances, the user privileges or user permissions associated with a user account may be accessed from a user account database, located remotely from the code monitor and detection computing platform 110, e.g., at the administrator computing device, or from records stored locally at the code monitor and detection computing platform 110, e.g., in the security tracking database 112b. Subsequent analysis of the code may also include analysis of the determined user privileges or user permissions. Based on the user permissions and the one or more identified potential vulnerabilities, security results of the code may be compiled. At step 212, the security results may be transmitted to the first developer computing device 130. In some instances, the security results may be transmitted in the form of a code result report that may include a summary of the security process executed on the code and identification of the one or more potential vulnerabilities.

Figure 2D:
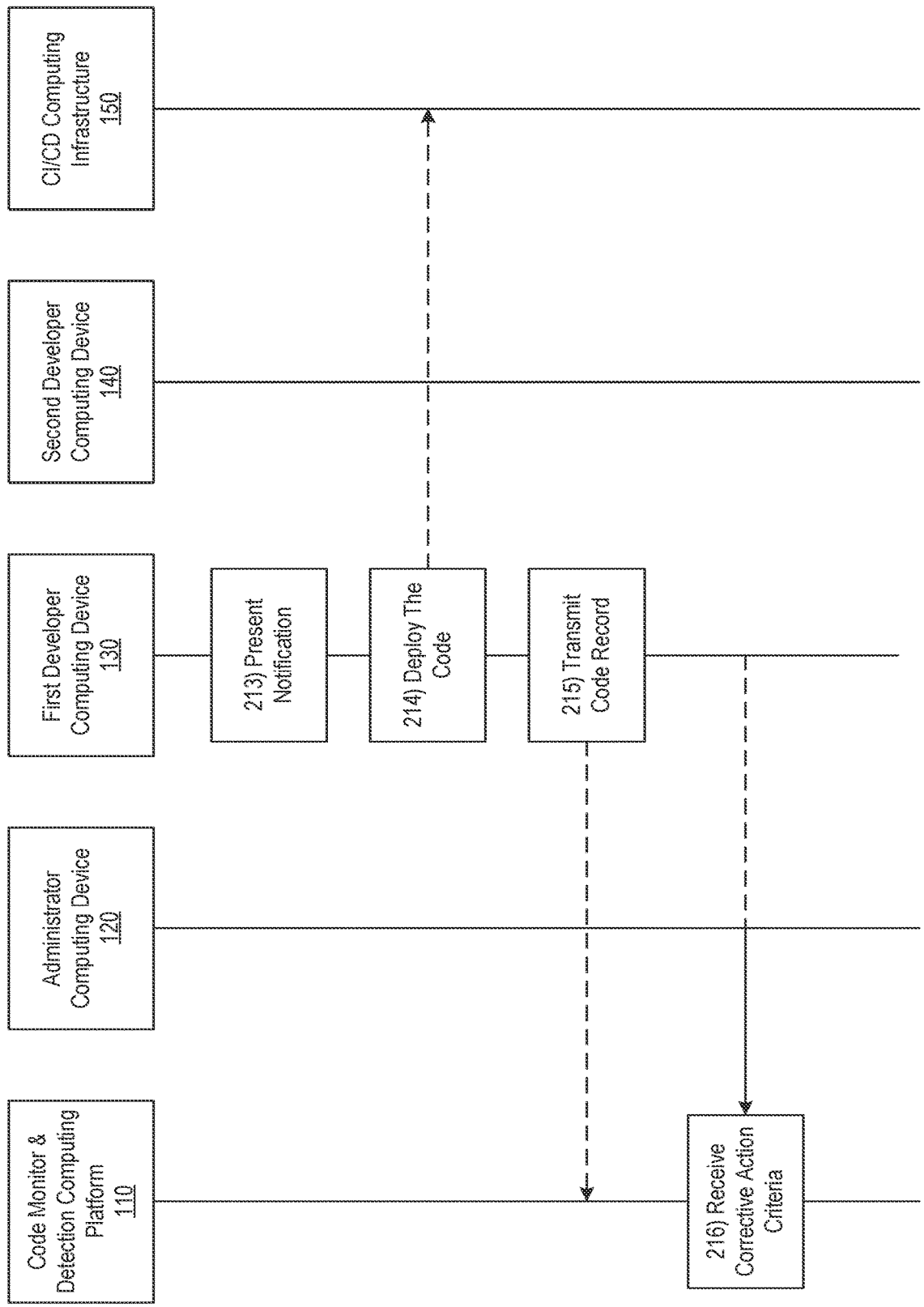

Referring to FIG. 2D, at step 213, the first developer computing device 130 may present a notification based on the security results transmitted at step 212. For example, if no potential vulnerabilities were detected in the code, the notification may indicate that hat no potential vulnerabilities were identified or the first developer computing device 130 may simply allow user to deploy the code. As another example, the notification may include an identification of the one or more potential vulnerabilities, user permissions, and/or recommended steps related to the identified one or more potential vulnerabilities.

At step 214, subsequent to presenting the notification, the first developer computing device 130 may deploy the code in the CI/CD environment. In some examples, the code may be automatically deployed in the CI/CD environment, e.g., if no potential vulnerabilities are detected, if a user has privileges that override any identified vulnerabilities, and the like. In some examples, the code monitor and detection computing platform 110 initiate deployment of the code following the security results. In certain examples where one or more potential vulnerabilities are detected and user permissions do not override those potential vulnerabilities, the first developer computing device 130 may first require modifications to the code so as to address the one or more potential vulnerabilities prior to deploying the code at step 214.

Following the deployment of the code, at step 215, the first developer computing device 130 may prepare, display, and/or transmit a code record to the code monitor and detection computing platform 110. The code record may include a report of code deployed by the first developer computing device 130 and an analysis of any potential vulnerabilities associated with the code. Various aspects of the code record may be stored by the code monitor and detection computing platform 110 for subsequent analysis and/or for refining techniques for identifying potential vulnerabilities and corrective actions, as will be described in more detail below. For example, the code monitor and detection computing platform 110 may train a machine learning model, using the machine learning engine 112d, to data in the code record to establish one or more factors for identification of a potential vulnerability in a code.

Figure 3:
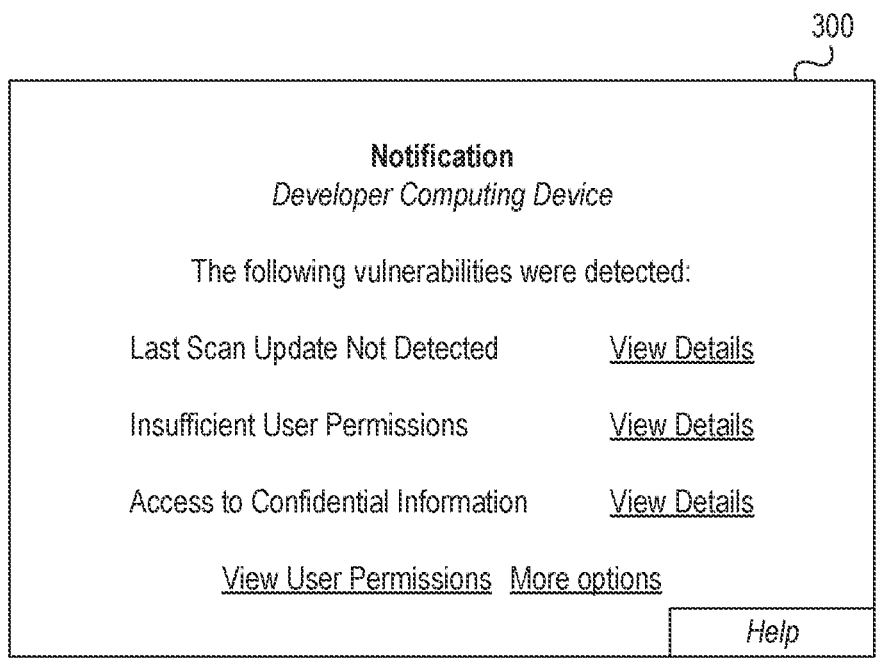
FIGS. 3-4 depict an illustrative graphical user interface for monitoring and detecting security vulnerabilities in software code to be executed in a CI/CD environment in accordance with one or more example embodiments.

The first developer computing device 130 may display the code record as part of step 215, e.g., in response to a user request to do so. For example, based on or in response to the one or more commands directing the first developer computing device 130 to display an interface relating to the code record, the first developer computing device 130 may display an interface with one or more components from the code record. In displaying the interface, the first developer computing device 130 may display a graphical user interface similar to graphical user interface 300, which is shown in FIG. 3. For example, the first developer computing device 130 may display a list of potential vulnerabilities or threats identified in the code, additional details related to each potential vulnerabilities, related user permission, options for addressing potential vulnerabilities, one or more corrective actions related to each identified potential vulnerability, and the like. Additionally or alternatively, the graphical user interface 300 may include links to access further information for each of the identified vulnerability, links to view user permissions and/or user exceptions, links to view options to reconfigure displayed information in graphical user interface 300, and the like. Upon selecting one or more of the links, the first developer computing device 130 may provide one or more additional interfaces related to the selected link. In some examples, a graphical user interface similar to graphical user interface 300 may be displayed at the code monitor and detection computing platform 110, at the administrator computing device 120, and/or at another suitable computing device within the CI/CD computing infrastructure 150.

Subsequent to transmitting the code record at step 215, at step 216, the code monitor and detection computing platform 110 may receive corrective action criteria associated with an enterprise organization from the administrator computing device 120 and/or the first developer computing device 130. In some examples, the code monitor and detection computing platform 110 may receive corrective action criteria on the fly, e.g., when analyzing a code. In some examples, the code monitor and detection computing platform 110 may initially receive and store corrective action criteria separate from analyzing codes. In such examples, the code monitor and detection computing platform 110 may periodically receive updates to the corrective action criteria based on changing cyber security policies with the enterprise organization, based on updates to available types of corrective actions, and the like. In some examples, the code monitor and detection computing platform 110 may only request corrective action criteria upon identifying one or more potential vulnerabilities in a code and upon determining that a user lacks suitable permissions to override such potential vulnerabilities.

Figure 2E:
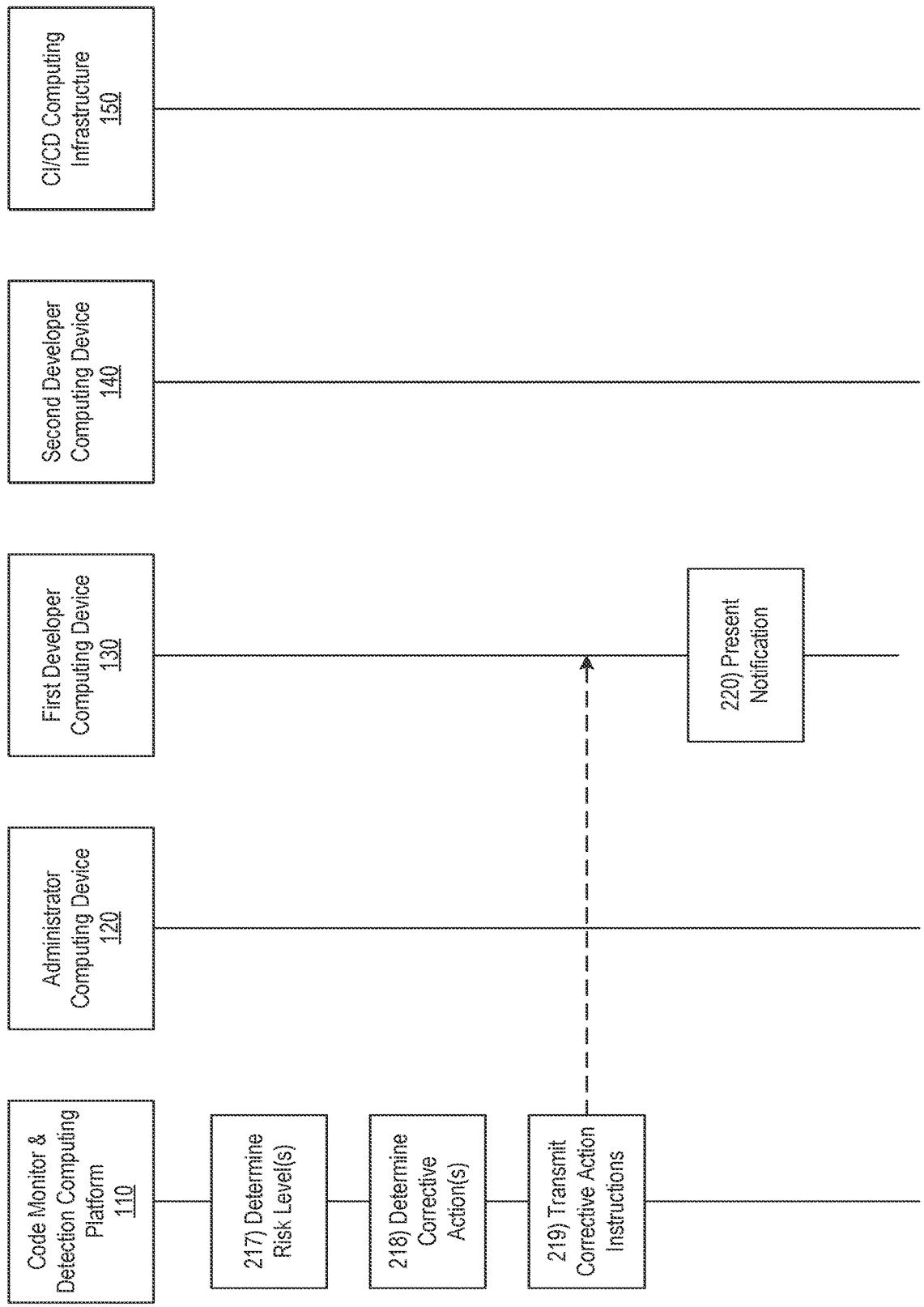

Referring to FIG. 2E, at step 217, the code monitor and detection computing platform 110 may determine a risk level from a plurality of risk levels for each potential vulnerability. In some instances, an alert action my subsequently be determined back on the risk level. The risk level may be determined based on the type of potential vulnerability, based on preferences or other settings set by an enterprise organization, based on prior incidents associated for a type of potential vulnerability, based on a risk exposure level associated with the potential vulnerability, and the like. In some instances, determining the alert action may include determining a type of vulnerability of each of the one or more potential vulnerabilities and determining user privileges associated with the user account information.

At step 218, the code monitor and detection computing platform 110 may determine one or more corrective actions for each potential vulnerability identified in the code. The one or more corrective actions may be determined based on one or more components of the user profile, the type of potential vulnerability, based on the associated risk level, based on input from the enterprise organization (e.g., the administrator computing device 120 and/or the CI/CD computing infrastructure 150), and the like. In some instances, identifying one or more corrective actions may include identifying an alert action from an alert action list. The alert action list may include performing a code scan, compiling a report including identification of one or more flagged portions of the code, modifying one or more portions of the code, transmitting an alert to an administrator computing device associated with an enterprise organization, and transmitting an alert to the developer computing platform. In such instances, sending the alert action may include transmitting a notification to the developer computing device. The notification may include an identification of the one or more potential vulnerabilities associated with the code. At step 219, the code monitor and detection computing platform 110 may transmit instructions to the first developer computing device 130 to perform the one or more corrective actions. The transmitting instructions may also include instructions to present one or more notifications at the first developer computing device 130.

At step 220, the first developer computing device 130 may present a notification related to the instructions received at step 219. For example, the notification may include a message that the code has one or more potential vulnerabilities and/or an indication of one or more corrective actions to be performed. In some instances, the notification may include additional information relating to the risks associated with the potential vulnerabilities, e.g., to better educate users on cybersecurity risks. In some instances, the notification may include selectable options to provide more information relating to the identified potential vulnerability and risks associated to the potential vulnerability. In some instances, the notification may include a graphical user interface similar to graphical user interface 300 shown in FIG. 3.

Figure 2F:
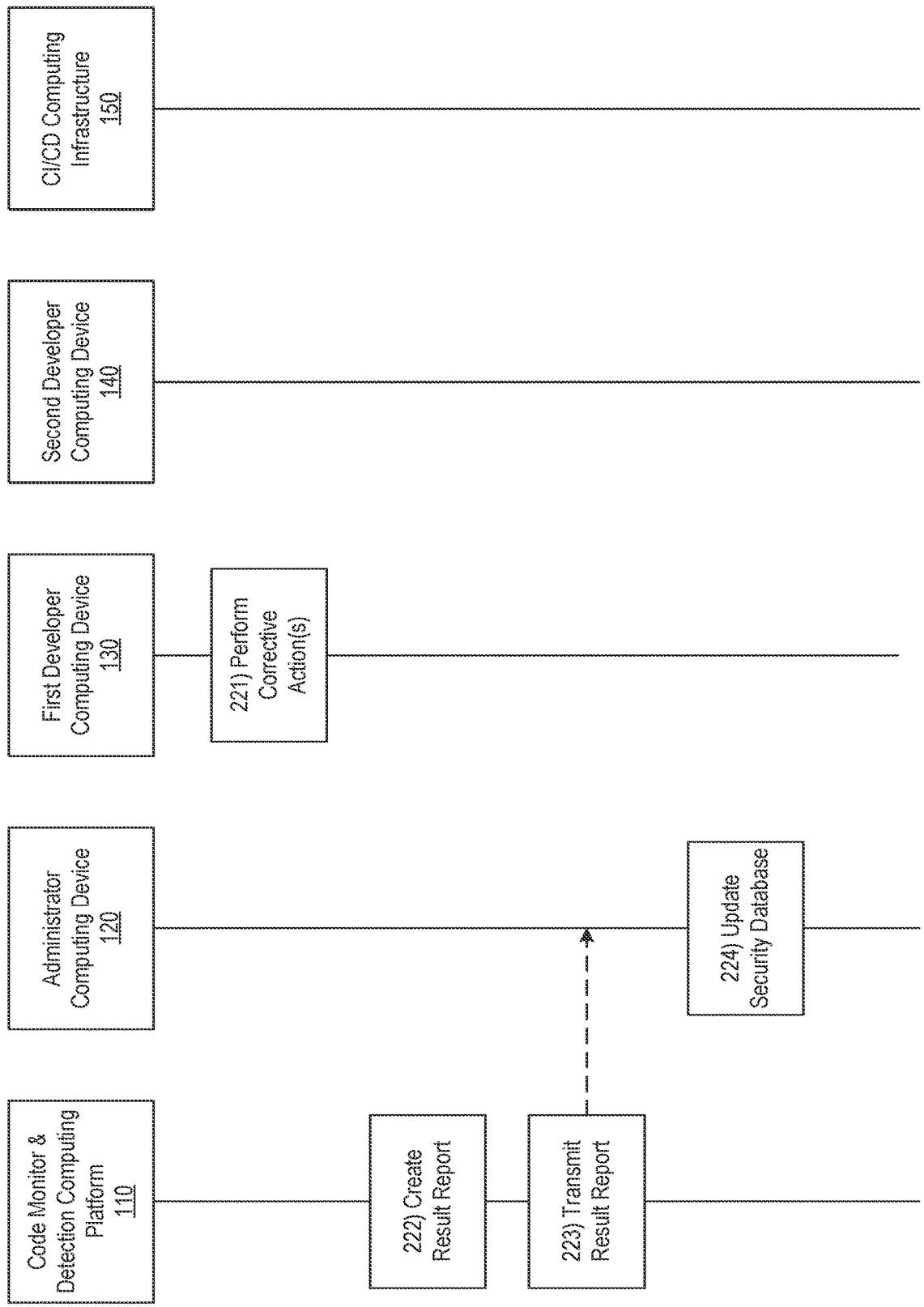

Now referring to FIG. 2F, at step 221, the first developer computing device 130 may perform one or more corrective actions based on the instructions transmitted at step 219. For example, the one or more corrective actions may include performing a code scan, modifying one or more portions of the code, transmitting an alert to the administrator computing device 120, and the like.

At step 222, the code monitor and detection computing platform 110 create a result report. The result report may be created after the code monitor and detection computing platform 110 has repeated steps 201-221 for a plurality of codes requested by the first developer computing device 130 and/or for a plurality of different user computing devices, e.g., including the second developer computing device 140. The result report may include a list of one or more codes that the first developer computing device 130 used or attempted to use and an analysis of potential vulnerabilities associated with each of the one or more codes, a list of one or more codes that the second developer computing device 140 used or attempted to use and an analysis of potential vulnerabilities associated with each of the one or more codes, and the like. Various aspects of the result report may be stored by the code monitor and detection computing platform 110 for subsequent analysis and/or for refining techniques for identifying potential vulnerabilities and corrective actions, as will be described in more detail below. For example, the code monitor and detection computing platform 110 may train a machine learning model to data in the result report to establish one or more factors for identifying a potential vulnerability in a code.

As part of step 222, the code monitor and detection computing platform 110 may generate a tracking interface associated with analyzed code and related user data. In some instances, in generating the tracking interface, the code monitor and detection computing platform 110 may generate and host an application programming interface (API) repository that includes a set of APIs that may provide details on relationships between one or more records in the result report and/or other repositories of tracked data. For example, the code monitor and detection computing platform 110 may host APIs that may provide corresponding account activity identifiers when provided with account type identifiers or account activity type identities. Accordingly, by implementing this API repository, the code monitor and detection computing platform 110 may relate information (e.g., related to types of codes, types of potential vulnerabilities, and the like) from multiple different records to a common event. In some instances, this may be advantageous for internal analytical needs and/or regulatory reporting.

Additionally or alternatively, in generating the tracking interface, the code monitor and detection computing platform 110 may generate a web based user interface that may be used for investigating and/or researching previously analyzed data (e.g., based on types of code commands, types of potential vulnerabilities, and the like) to query data based on common groupings and/or other information. By generating such an interface, the code monitor and detection computing platform 110 may provide a full detailed view of analyzed data.

In some instances, the code monitor and detection computing platform 110 may generate one or more commands directing an enterprise computing device of the CI/CD computing infrastructure 150 or a user computing device, such as the first developer computing device 130 or the second developer computing device 140 to display the tracking interface. The code monitor and detection computing platform 110 may send the tracking interface and the one or more commands directing the enterprise computing device or user computing device to display the tracking interface via the communication interface 113.

An enterprise computing device (e.g., administrator computing device 120) or user computing device (e.g., first developer computing device 130, second developer computing device 140) may receive the tracking interface and the one or more commands directing the computing device to display the tracking interface. For example, an enterprise computing device (e.g., administrator computing device 120) or user computing device (e.g., first developer computing device 130, second developer computing device 140) may receive the tracking interface and the one or more commands directing the computing device to display the tracking interface responsive the enterprise computing device or user computing device sending instructions to the code monitor and detection computing platform 110 for creation of the tracking interface. At step 223, the code monitor and detection computing platform 110 may transmit the result report and the tracking interface to the administrator computing device 120.

Figure 4:
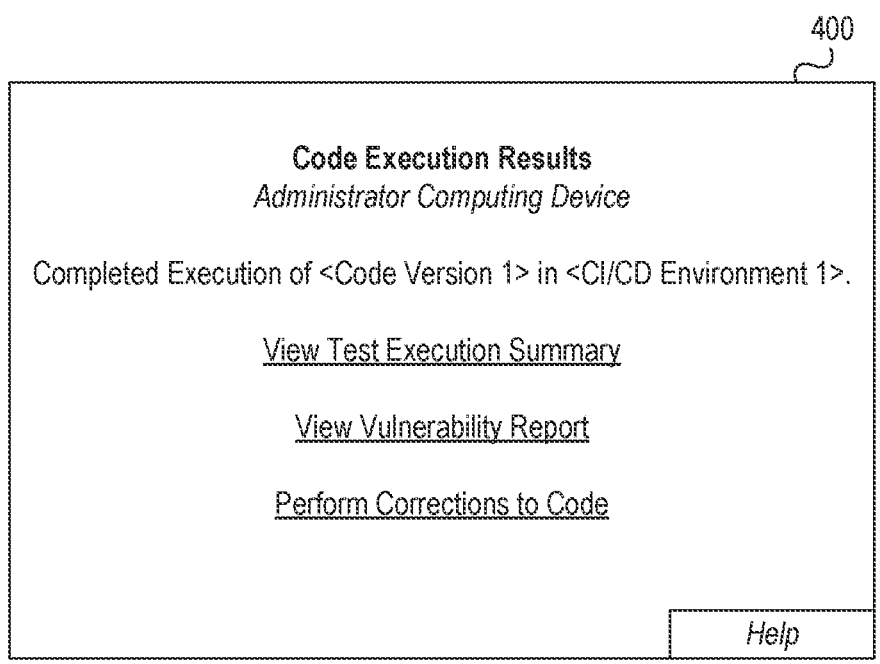

As part of step 223, the administrator computing device 120 may display the tracking interface based on information in the result report. In some instances, the result report transmitted at step 223 may cause the display of a tracking interface on the administrator computing device 120 with information related to the result report, such as graphical user interface 400, which is depicted in FIG. 4. As seen in FIG. 4, graphical user interface 400 may include one or more user interface elements enabling a user of the administrator computing device 120 to display information associated with the result report, such as a scrollable listing of code tracking. In some instances, the administrator computing device 120 may provide a message and/or other information corresponding to one or more results from executing the code. As seen in FIG. 4, graphical user interface 400 may include one or more user interface elements enabling a user of the administrator computing device 120 to access a result report associated with the execution of the test code, access a detailed vulnerability report associated with the execution of the code in the CI/CD environment, perform corrections to one or more codes, and/or access other options associated with execution of the code. The graphical user interface 400 may include one or more user interface elements enabling a user of the administrator computing device 120 to view results data associated with the analysis and/or the execution of the code by a CI/CD environment, and may further provide a selectable option to perform one or more corrections to the code where the code monitor and detection computing platform 110 has detected potential vulnerabilities. In some instances, the displayed information may include, for each entry, user information, user computer information, code information, identified vulnerabilities, determined corrective actives, identified user exceptions or permission, subsequent activity at the developer computing device related to the code, and the like. In some examples, user account information may also selectably be provided in the graphical user interface 400, e.g., where the administrator computing device 120 is authorized to access and display such information. In some examples, the graphical user interface 400 may include one or more interface elements to allow the user of the administrator computing device 120 to view the one or more user specific reports. At step 224, the administrator computing device 120 may update the security database. Updates to the security database may be determined based on the information provided in the result report.

While graphical user interface 300 of FIG. 3 is depicted for display on the first developer computing device 130 and the graphical user interface 400 of FIG. 4 is depicted for display on the administrator computing device 120, similar graphical user interfaces may also be generated, displayed, and/or otherwise presented on other computing devices or systems, such as a computing device of the CI/CD computing infrastructure 150, code monitor and detection computing platform 110, the second developer computing device 140, and the like.

Although a single code monitor and detection computing platform 110 is described herein, any number of monitor and detection computing platforms may be implemented using one or more of the methods described herein without departing from the scope of the disclosure. Furthermore, although the tracking interface is described with regard to display at the administrator computing device 120, the tracking interface may, in some instances, be displayed at a user device, such as the first developer computing device 130 or the second developer computing device 140, without departing from the scope of the disclosure.

Figure 5:
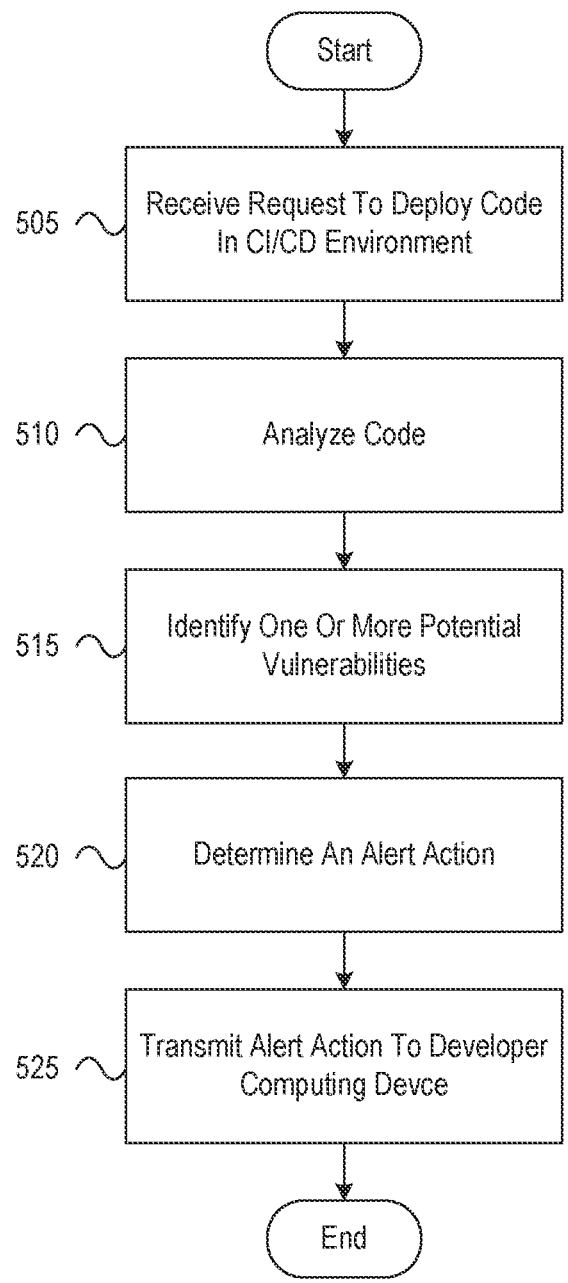
FIG. 5 depicts an illustrative method for monitoring and detecting security vulnerabilities in software code to be executed in a CI/CD environment in accordance with one or more example embodiments.

FIG. 5 depicts an illustrative method for monitoring and detecting security vulnerabilities in software code to be executed in a CI/CD environment in accordance with one or more example embodiments. Referring to FIG. 5, at step 505, a computing platform having at least one processor, a communication interface, and memory may receive, from a developer computing device, an indication of a user request to deploy a code in a CI/CD environment. The indication of the user request may include user account information and the code.

At step 510, the computing platform may analyze the code. Analyzing the code at step 510 may include performing a security process on the code. Analyzing the code at step 510 may include identifying one or more commands in the code that match a predefined list of commands associated with potential vulnerabilities. Analyzing the code at step 510 may include assessing a scan history of the code and comparing the scan history with code scan policies associated with an enterprise organization. In some instances, analyzing the code may include assessing the code relative to an enterprise security protocol list that is dynamically updated with a machine learning engine based on vulnerability reports received from at least one user computing device associated with an enterprise organization. In some instances, analyzing the code may include accessing, from a user account database, user privileges associated with the user account and analyzing the user privileges.

At step 515, the computing platform may identify one or more potential vulnerabilities based on analysis of the code. In some instances, identifications of one or more potential vulnerabilities at step 515 may include analyzing user account information in combination with analyzing the code. In some instances, analyzing the code may include determining a risk level from a plurality of risk levels for each identified potential vulnerability.

At step 520, the computing platform may, based on identifying one or more potential vulnerabilities, determine an alert action responsive to the one or more potential vulnerabilities. The alert action may be determined for each identified potential vulnerability or for the code as a whole. Identifying alert action at step 520 may include selecting an alert action from a plurality of alert actions. In some instances, determining the alert action may include determining a type of vulnerability of each of the one or more potential vulnerabilities and determining user privileges associated with the user account information. User privileges may be specific to one or more potential vulnerabilities or specific to particular users in general. In some instances, the alert action may be determined based on a risk level associated with each or the one or more potential vulnerabilities. In some instances, determining the alert action may include identifying an alert action based on an alert action list that includes performing a code scan, compiling a report including identification of one or more flagged portions of the code, modifying one or more portions of the code, transmitting an alert to an administrator computing device associated with an enterprise organization, and transmitting an alert to the developer computing device.

At step 525, the alert action may be transmitted, via the communication interface, to the developer computing device. In some examples, the alert action may include instructions to the developer computing device to perform the one or more corrective actions. The developer computing device may subsequently perform the one or more corrective actions. Transmitting the alert action may include transmitting a notification to the developer computing device that includes an identification of the one or more potential vulnerabilities associated with the code. In some instances, transmitting the alert action may include compiling and transmitting a code result report that includes a summary of analysis of the code and the identification of one or more potential vulnerabilities. In some instances, the alert action may only be transmitted to the developer computing device based on identifying the presence of one or more potential vulnerabilities in the code. In some instances based on identifying an absence of potential vulnerabilities in the code, the computing platform may deploy the code to run in the CI/CD environment.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, from a developer computing platform in a networked computing system, an indication of a user request to deploy a code in a continuous integration and continuous delivery (CI/CD) environment, wherein the user request includes user account information and the code, wherein the networked computing system is configured to manage electronic transactions by one or more computing devices in a multi-device enterprise organization network;
   analyze the code to identify a presence of one or more potential vulnerabilities in the code, wherein analyzing the code includes assessing a scan history of the code, comparing the scan history with code scan policies associated with an enterprise organization, and executing a security process on the code;
   based on identifying the presence of one or more potential vulnerabilities in the code, determine an alert action; and
   send, via the communication interface, to the developer computing platform, the determined alert action to automatically trigger an alert action sequence at the developer computing platform in accordance with the determined alert action.

2. The computing platform of claim 1, wherein analyzing the code includes assessing one or more settings based on the user account information.

3. The computing platform of claim 1, wherein the memory stores additional computer-readable instructions that, when executed by the at least one processor, cause the computing platform to:
   compile a code result report, the code result report including a summary of the security process executed on the code and identification of one or more potential vulnerabilities.

4. The computing platform of claim 1, wherein analyzing the code includes assessing the code relative to an enterprise security protocol list, and wherein the enterprise security protocol list is dynamically updated with a machine learning engine based on vulnerability reports received from at least one user computing device associated with an enterprise organization.

5. The computing platform of claim 1, wherein the memory stores additional computer-readable instructions that, when executed by the at least one processor, cause the computing platform to:
   access, from a user account database, user privileges associated with the user account information,
   wherein analyzing the code includes analyzing the user privileges.

6. The computing platform of claim 1, wherein determining the alert action includes determining a type of vulnerability of each of the one or more potential vulnerabilities and determining user privileges associated with the user account information.

7. The computing platform of claim 1, wherein analyzing the code includes determining a risk level from a plurality of risk levels for each identified potential vulnerability, and wherein the alert action is determined based on the risk level.

8. The computing platform of claim 1, wherein determining the alert action includes identifying an alert action based on an alert action list that includes performing a code scan, compiling a report including identification of one or more flagged portions of the code, modifying one or more portions of the code, transmitting an alert to an administrator computing device associated with an enterprise organization, and transmitting an alert to the developer computing platform.

9. The computing platform of claim 8, wherein sending the alert action includes transmitting a notification to the developer computing platform, wherein the notification includes an identification of the one or more potential vulnerabilities associated with the code.

10. A method comprising:
at a computing platform comprising at least one processor, a communication interface, and memory:
receiving, via the communication interface, from a developer computing platform in a networked computing system, an indication of a user request to deploy a code in a CI/CD environment, wherein the user request includes user account information and the code, wherein the networked computing system is configured to manage electronic transactions by one or more computing devices in a multi-device enterprise organization network;
analyzing the code and the user account information, wherein analyzing the code and the user account information includes assessing a scan history of the code and comparing the scan history with code scan policies associated with an enterprise organization;
identifying a presence of one or more potential vulnerabilities in the code based on analyzing the code and the user account information;
based on identifying the presence of one or more potential vulnerabilities in the code, determining an alert action from a plurality of alert action; and
sending, via the communication interface, to the developer computing platform, the determined alert action to automatically trigger an alert action sequence at the developer computing platform in accordance with the determined alert action.

11. The method of claim 10, further comprising:
compiling a code result report, the code result report including a summary of analysis of the code and identification of one or more potential vulnerabilities.

12. The method of claim 10, wherein analyzing the code and the user account information includes assessing the code relative to an enterprise security protocol list, and wherein the enterprise security protocol list is dynamically updated with a machine learning engine based on vulnerability reports received from at least one user computing device associated with an enterprise organization.

13. The method of claim 10, further comprising:
accessing, from a user account database, user privileges associated with the user account information, wherein analyzing the code and the user account information includes analyzing the user privileges.

14. The method of claim 10, wherein determining the alert action includes determining a type of vulnerability of each of the one or more potential vulnerabilities and determining user privileges associated with the user account information.

15. The method of claim 10, wherein analyzing the code and the user account information includes determining a risk level from a plurality of risk levels for each identified potential vulnerability, and wherein the alert action is determined based on the risk level.

16. The method of claim 10, wherein determining the alert action includes identifying an alert action based on an alert action list that includes performing a code scan, compiling a report including identification of one or more flagged portions of the code, modifying one or more portions of the code, transmitting an alert to an administrator computing device associated with an enterprise organization, and transmitting an alert to the developer computing platform.

17. One or more non-transitory computer-readable media storing instructions that, when executed by a computing platform comprising at least one processor, a communication interface, and memory, cause the computing platform to:
receive, via the communication interface, from a developer computing platform in a networked computing system, an indication of a user request to deploy a code in a CI/CD environment, wherein the user request includes user account information and the code, wherein the networked computing system is configured to manage electronic transactions by one or more computing devices in a multi-device enterprise organization network;
analyze the code to identify a presence of one or more potential vulnerabilities in the code, wherein analyzing the code includes executing a security process on the code, wherein analyzing the code and the user account information includes assessing a scan history of the code and comparing the scan history with code scan policies associated with an enterprise organization;
based on identifying the presence of one or more potential vulnerabilities in the code, send, via the communication interface, to the developer computing platform, an alert action relating to the presence of one or more potential vulnerabilities in the code to automatically trigger an alert action sequence at the developer computing platform in accordance with the alert action; and
based on identifying an absence of potential vulnerabilities in the code, automatically deploy the code to run in the CI/CD environment.

* * * * *

UNITED STATES PATENT AND TRADEMARK OFFICE
CERTIFICATE OF CORRECTION

| | | |
|---|---|---|
| PATENT NO. | : 11,822,916 B2 | Page 1 of 1 |
| APPLICATION NO. | : 17/570106 | |
| DATED | : November 21, 2023 | |
| INVENTOR(S) | : Charles Philip | |

It is certified that error appears in the above-identified patent and that said Letters Patent is hereby corrected as shown below:

On the Title Page

Column 1, (72) Inventor:
Please delete "Mumbia" and insert --Mumbai--

Signed and Sealed this
Thirtieth Day of September, 2025

John A. Squires
*Director of the United States Patent and Trademark Office*